United States Patent
Bleyer et al.

(10) Patent No.: US 11,776,138 B2
(45) Date of Patent: Oct. 3, 2023

(54) CORRECTING LINE BIAS IN AN IMAGE

(71) Applicant: Microsoft Technology Licensing, LLC, Redmond, WA (US)

(72) Inventors: Michael Bleyer, Seattle, WA (US); Christopher Douglas Edmonds, Carnation, WA (US); Raymond Kirk Price, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 198 days.

(21) Appl. No.: 17/122,661

(22) Filed: Dec. 15, 2020

(65) Prior Publication Data

US 2022/0189043 A1 Jun. 16, 2022

(51) Int. Cl.
*G06T 7/11* (2017.01)
*G06T 7/136* (2017.01)
*G06T 7/269* (2017.01)

(52) U.S. Cl.
CPC ............... *G06T 7/269* (2017.01); *G06T 7/11* (2017.01); *G06T 7/136* (2017.01); *G06T 2207/20192* (2013.01); *G06T 2207/20201* (2013.01)

(58) Field of Classification Search
CPC . G06T 7/11; G06T 7/136; G06T 7/269; G06T 2207/20192; G06T 2207/20201
See application file for complete search history.

(56) References Cited

U.S. PATENT DOCUMENTS

| | | | | |
|---|---|---|---|---|
| 10,825,377 | B2 * | 11/2020 | Lee | G09G 3/32 |
| 2010/0220193 | A1 * | 9/2010 | Hogasten | H04N 5/33 |
| | | | | 348/E5.09 |
| 2012/0189191 | A1 * | 7/2012 | Bai | H04N 13/133 |
| | | | | 382/154 |
| 2014/0037225 | A1 * | 2/2014 | Hogasten | G06T 5/50 |
| | | | | 382/260 |
| 2016/0373618 | A1 * | 12/2016 | Tajbakhsh | H04N 25/63 |
| 2019/0368941 | A1 | 12/2019 | Aziz et al. | |

FOREIGN PATENT DOCUMENTS

| | | | | | |
|---|---|---|---|---|---|
| CN | 103118236 | A | * | 5/2013 | |
| CN | 103164846 | A | * | 6/2013 | |
| CN | 107909559 | A | * | 4/2018 | G06T 3/4007 |
| CN | 109903235 | A | * | 6/2019 | |
| JP | 6251272 | B2 | * | 12/2017 | H04N 5/2176 |

OTHER PUBLICATIONS

"International Search Report and Written Opinion Issued in PCT Application No. PCT/US2021/043273", dated Oct. 15, 2021, 11 Pages.

* cited by examiner

*Primary Examiner* — Yubin Hung
(74) *Attorney, Agent, or Firm* — Alleman Hall Creasman & Tuttle LLP (57) ABSTRACT

Examples are described that relate to correcting line bias in images. One example provides a method comprising receiving, from an imaging device, a plurality of images each comprising a plurality of lines of pixels. The method further comprises, for each image of the plurality of images, for each line of pixels of the plurality of lines of pixels, based at least on one or more pixel values of one or more pixels in the line of pixels, determining a line bias correction for the line, and applying the line bias correction to each pixel in the line, the line bias correction comprising an offset applied to each pixel value in the line of pixels.

19 Claims, 7 Drawing Sheets

```
struct DynProgTable
{
    int costs[height][maxBias + 1];
    int path[height][maxBias + 1];
};

void DynProgIterative()
{
    DynProgTable table;

// initialize last row
    for (int bias = 0; bias <= maxBias; bias++)
    {
        table.costs[height - 1][bias] = 0;
        table.path[height - 1][bias] = 0;
    }

// main DP loop
    for (int y = height - 2; y >= 0; y--)
    {
        for (int biasCurRow = 0; biasCurRow <= maxBias; biasCurRow++)
        {
            int bestCosts = infinity;
            int bestBias = 0;

for (int biasNextRow = 0; biasNextRow <= maxBias; biasNextRow++)
            {
                int costs =
                    ComputeGradient(y, biasCurRow, y + 1, biasNextRow) +
                    table.costs[y + 1][biasNextRow];

if (costs < bestCosts)
                {
                    bestCosts = costs;
                    bestBias = biasNextRow
                }
            } table.costs[y][biasCurRow] = bestCosts;
            table.path[y][biasCurRow] = bestBias;
        }
    } int optimalBias[height];
```

FIG. 5A

```
// backtracking
    int bestCosts = infinity;
    int bestBias = 0;

for (int bias = 0; bias <= maxBias; bias++)
    {
        int costs = table.costs[0][bias];

if (costs < bestCosts)
        {
            bestCosts = costs;
            bestBias = bias;
        }
    }
    optimalBias[0] = bestBias;

for (int y = 0; y < height - 1; y++)
    {
        bestBias = table.path[y][bestBias];
        optimalBias[y + 1] = bestBias;
    }
}
```

CORRECTING LINE BIAS IN AN IMAGE

BACKGROUND

Images captured by a camera may be subject to various sources of noise, including noise arising from camera circuitry. In low light conditions, such noise can detrimentally impact a signal-to-noise ratio (SNR) of the camera.

SUMMARY

Examples are disclosed that relate to correcting line bias in images. One example provides a method comprising receiving, from an imaging device, a plurality of images each comprising a plurality of lines of pixels. The method further comprises, for each image of the plurality of images and for each line of pixels of the plurality of lines of pixels in the image, based at least on one or more pixel values of one or more pixels in the line of pixels, determining a line bias correction for the line, and applying the line bias correction to each pixel in the line, the line bias correction comprising an offset applied to each pixel value in the line of pixels.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As mentioned above, images captured by an imaging device may be subject to various sources of noise. In some imaging devices, circuitry in the imaging device itself may contribute noise to captured images. For example, signals used to drive the pixels can be subject to voltage and/or current drift caused by temperature fluctuations and/or other factors. These can result in variances in the output of the image sensor that manifest as noise in the resulting image. Readout circuitry can suffer similar issues.

Different groups of image sensing pixels in an image sensor may be affected differently by operational variances in image sensor circuitry. As one example, an image sensor may include a plurality of pixels arranged in lines (e.g., rows and columns), with each line of pixels being driven by a respective amplifier. Variance in the output of an amplifier may result in the addition of an offset bias to the pixel values (e.g., greyscale intensity or multi-channel intensities) recorded by the pixels in the line driven by that amplifier. As used herein, "bias" refers to an additive offset to the pixel value recorded by a pixel of an image sensor, and "readout value" refers to the value read out from a pixel including its pixel value and a possible bias modifying the pixel value as read. A "line bias" as used herein refers to a common bias that applies to a line of image sensing elements, where "line" refers to a plurality of image sensor pixels affected by a common bias (e.g., a row or column of pixels driven by a common amplifier).

Operational variances may differ among amplifiers that are used to drive different lines of pixels of an image sensor. For example, a first amplifier configured to drive a first line of pixels may provide an output of 1.1 mV, while a second amplifier configured to provide the same output as the first amplifier and to drive a second line of pixels may provide an output of 1.2 mV. As a result, the first line of pixels driven by the first amplifier may experience a first bias in the pixel values recorded in the first line, while a second line of pixels driven by the second amplifier may experience a second bias, different from the first bias, in the pixel values recorded in the second line. This may cause images captured by the image sensor to exhibit noise in the form of bands or streaks of differing intensities or contrast that reduce image quality and thus impact the SNR of the image sensor. Further, these biases can change between images due to the nature of the drifts that give rise to the biases. Operational variance in readout circuitry used to read out image data collected by an image sensor may also induce bias in pixel values that may potentially differ among different lines of pixels, and such biases also may change from frame to frame. Such noise can be particularly detrimental to low-signal images, such as low-light images and thermal images.

One approach to addressing line bias in images is to use image filtering. However, filtering methods may iterate over all pixels within a window centered on every individual pixel of an image, which is computationally expensive, and can result in blur and associated loss in informational content in the output image relative to the input image. Another approach to addressing line bias in images is to experimentally determine a bias in each line of pixels and store the biases as a calibration to apply to images. However, such a calibration procedure assumes that the line biases remain constant among different images, whereas sources of line bias can fluctuate over time. A line bias that varies over time (e.g., among images, within an imaging device use session) is referred to herein as "temporal line noise". In view of the temporal variability of line bias, such calibrations may not be effective.

Accordingly, examples are disclosed that relate to correcting line bias and temporal line noise in images. As described in more detail below, a line bias correction is determined for and applied to each line of pixels in each image frame to produce a bias-corrected image on an image-by-image basis. The determination of the line bias correction is formulated as an optimization problem in which the value of a cost function is minimized by varying bias terms representing a potential bias in lines of pixels lines. In some examples, the cost function is defined as a sum of gradients between pixels in a line for which a line bias correction is sought, and pixels in an adjacent line or lines. Such an optimization method can be efficiently performed via dynamic programming techniques to reduce computational cost. These and other aspects of the disclosed examples may facilitate the production and real-time display of images that are corrected with respect to line bias and temporal line noise.

Figure 1:
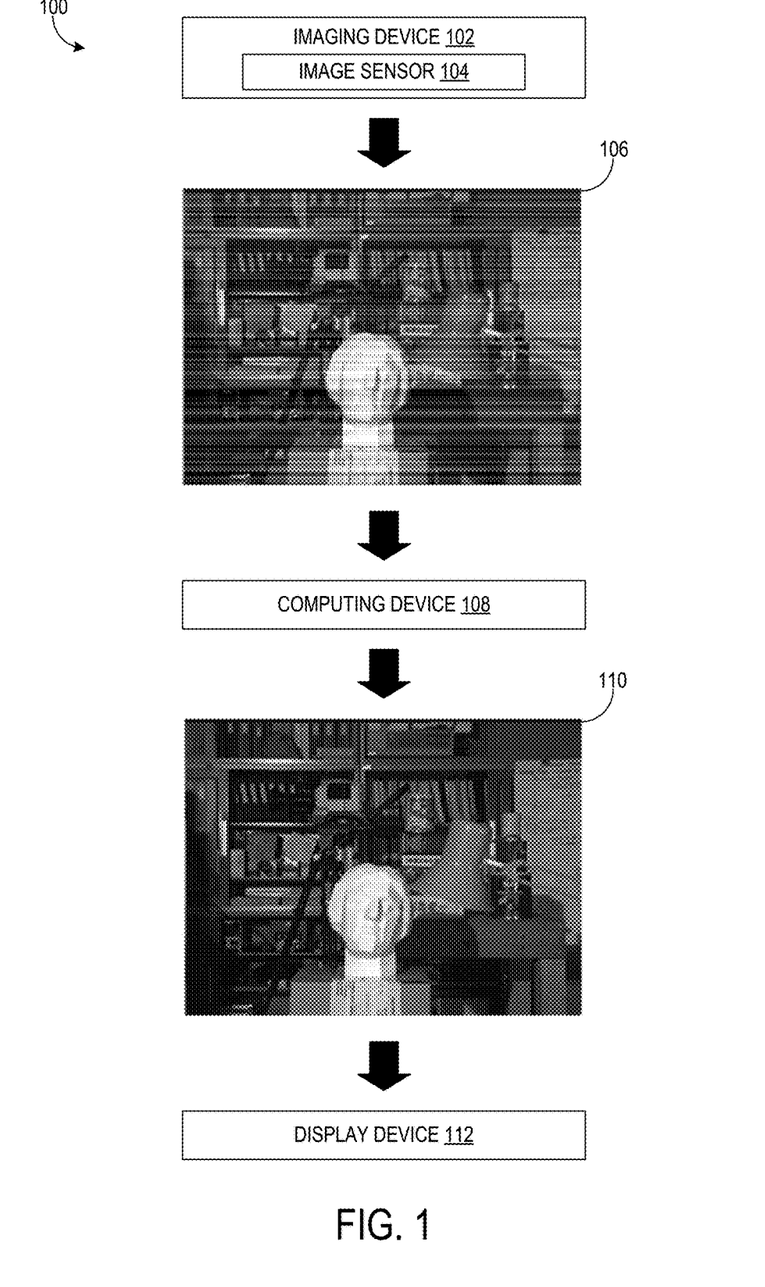
FIG. 1 shows an example pipeline for correcting line bias and temporal line noise in images, and illustrates an example image before and after correction.

FIG. 1 schematically shows an example computing pipeline 100 for correcting line bias and temporal line noise in images. In pipeline 100, an imaging device 102 utilizes an image sensor 104 to capture a plurality of images including image 106. Image 106 may be an image within a video stream, such as a low-light or thermal image video stream. As seen in FIG. 1, image 106 exhibits noise in the form of high-frequency bands or streaks of differing greyscale contrast. This noise arises from differing line biases among lines, which may be induced by operational variance in drive and/or readout circuitry in image sensor 104, for example. Moreover, the noise in images captured by imaging device 102 fluctuates over time, and as such exhibit temporal line noise. The line bias noise depicted in image 106 is simulated noise generated for experimental purposes, but is representative of the effect.

To correct the line bias and resulting noise in image 106, image 106 is output to a computing device 108 that determines corrections for the line biases in the received images on a frame-by-frame basis. FIG. 1 depicts a bias-corrected image 110 produced by computing device 108 by applying line bias corrections to image 106. In contrast to image 106, bias-corrected image 110 does not exhibit the noise present in image 106. Bias-corrected image 110 is then output for display by a display device 112. The bias-corrected images can be generated and displayed in real-time, so that a frame rate of a video image stream is preserved.

While FIG. 1 depicts the output of greyscale images from imaging device 102, in other examples, imaging device 102 may produce multi-channel color images. Further, imaging device 102 may assume any suitable form, such as that of a thermal camera or camera configured to capture images in low-light conditions. Such image sensors, which are configured to operate in low-signal conditions, may be limited by temporal line noise, rather than being limited by shot noise or signal noise. Accordingly, pipeline 100 may be used to correct line bias and temporal line noise in such images, and thereby mitigate this limitation. In various examples, imaging device 102, computing device 108, and display device 112 may be implemented in a common device, or one or more may be implemented as separate devices. As one example, a head-mounted display (HMD) device may comprise each of imaging device 102, computing device 108, and display device 112—e.g., to enable real-time display of bias-corrected images in a video stream captured by imaging device 102.

Figure 2:
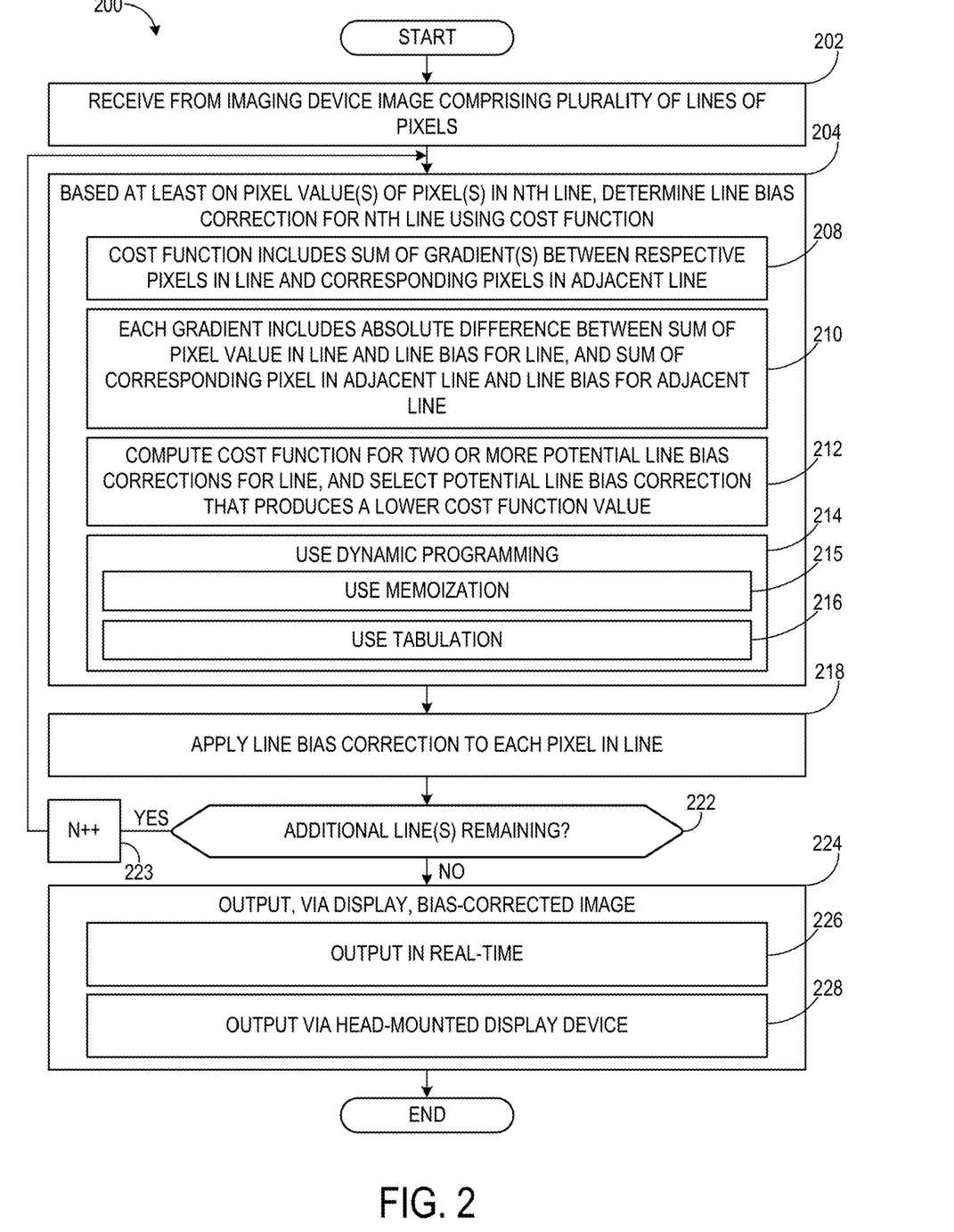
FIG. 2 shows an example method of correcting line bias and temporal line noise in images.

FIG. 2 shows a flowchart illustrating an example method 200 of correcting line bias and temporal line noise in images. Pipeline 100 of FIG. 1 may represent an example implementation of method 200, for example. At 202, method 200 includes receiving from an imaging device an image comprising a plurality of lines of pixels. The lines can be horizontal lines and/or vertical pixel lines in various examples. At 204, method 200 includes determining a line bias correction for an nth line of pixels in the image, based at least on pixel values in the nth line, using a cost function. In some examples, the cost function may include a sum of gradients, as indicated at 208, with each gradient being computed between a respective pixel in the nth line of pixels and a corresponding pixel in a line of pixels adjacent to the nth line. As a more specific example, the gradient for a first pixel in the nth line of pixels can be computed between the first pixels of the nth and n+1th line of pixels, and the gradient for the second pixel in the nth line of pixels can be computed between the second pixels in the nth and n+1th lines of pixels.

Figure 3:
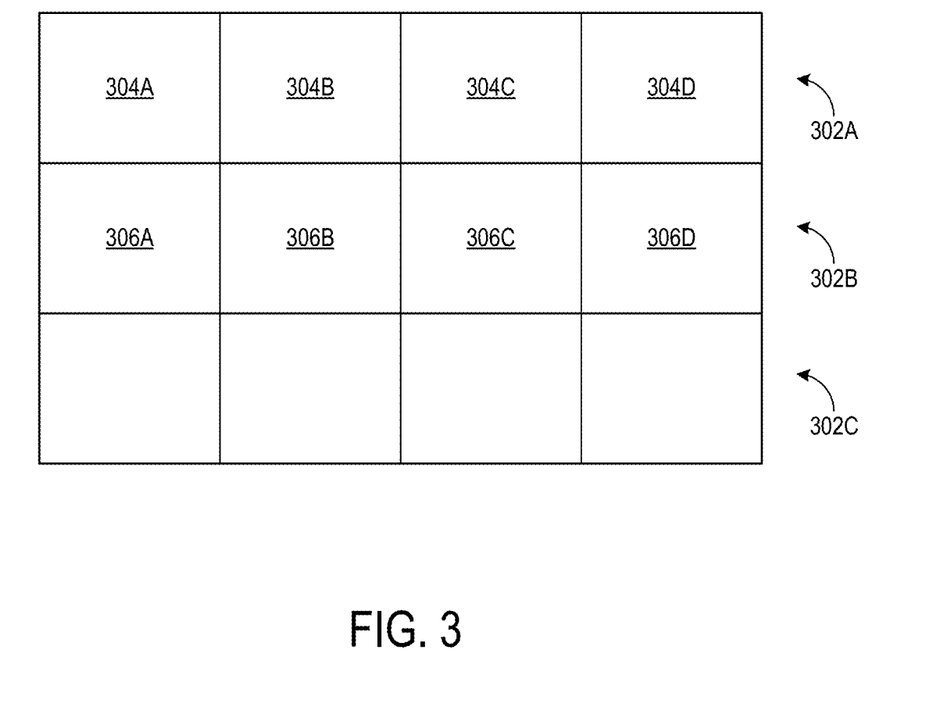
FIG. 3 shows a block diagram of pixels in an example image.

FIG. 3 shows a highly schematic depiction of a portion of an example image 300. FIG. 3 depicts three lines of pixels 302A, 302B, and 302C each including four pixels. To determine a line bias correction for line 302A, a sum of gradients determined for all of the pixels of line 302A is computed, with each gradient being computed between the readout value of a respective pixel in line 302A and the readout value of a corresponding pixel in adjacent line 302B. In particular, the gradients that are summed to determine the value of the cost function include (i) a gradient between a pixel 304A in line 302A and a pixel 306A in line 302B, (ii) a gradient between a pixel 304B in line 302A and a pixel 306B in line 302B, (iii) a gradient between a pixel 304C in line 302A and a pixel 306C in line 302B, and (iv) a gradient between a pixel 304D in line 302A and a pixel 306D in line 302B. The gradients may be computed in any suitable manner. As one example, each gradient may be computed as the absolute value of the difference between the readout values of the pixels being compared.

The readout value for each pixel is a function both of the exposure of the pixel to light ("pixel value") and also to any line bias arising from drive circuitry, readout circuitry, and/or other sources. Thus, as shown in FIG. 2 each gradient represents an absolute difference between a sum of a pixel value in the nth line and a line bias for the nth line, and a sum of a corresponding pixel value in an adjacent line and a line bias for the adjacent line, as indicated at 210. As described above, the presence of a line bias applies an additive offset to the pixel values.

As such, a bias term can be added to the readout values of the pixels in line of pixels and then adjusted to mitigate the effect of the line bias on the value of the cost function. Referring again to FIG. 3, the gradient computed between pixel 304A and pixel 306A may be computed as the difference (e.g., absolute difference) between (i) the sum of the readout value of pixel 304A and a bias term representing the line bias affecting line 302A, and (ii) the sum of the readout value of pixel 306A and a bias term representing the line bias affecting line 302B. Gradients between pixels 304B and 306B, 304C and 306C, and 304D and 306D may be computed similarly, by applying the line bias of pixel 304A to pixels 304B-D, and applying the line bias of pixel 306A to pixels 306B-D. As mentioned above, gradients can be computed for two adjacent lines of pixels (e.g. a row above and a row below) in some examples. After computing the gradients for a line of pixels, all gradients for the line are summed. While an absolute difference is used as a gradient in this example, any other suitable gradient computations can be used in other examples.

Returning to FIG. 2, at 212, method 200 comprises computing the cost function for each of two or more potential line bias corrections for the nth line, and selecting the potential line bias correction that produces a lower cost function value. "Line bias correction" refers to the bias term that is adjusted to reduce the cost function. Referring again to FIG. 3, gradients between adjacent pixels in lines 302A and 302B may be computed using different bias values for one or both lines to determine which bias values reduce the cost function more. As an example, for two different bias values of 1 and 2, gradients between adjacent pixels may be computed for (i) line 302A having a bias of 1 and line 302B having a bias of 1, (ii) line 302A having a bias of 1 and line 302B having a bias of 2, (iii) line 302A having a bias of 2 and line 302B having a bias of 1, and (iv) line 302A having a bias of 2 and line 302B having a bias of 2. In some examples, every combination of possible bias values may be used in evaluating the cost function.

The cost function may be computed for different potential line bias corrections until any suitable condition is met. For example, the cost function may be computed until the value of the cost function is equal to or less than a threshold value, for a predetermined number of iterations, or until a determined minimum (local or global) is reached.

A global optimal solution can be found by iterating through all possible assignment of line biases to lines via recursion. If b denotes the number of possible line biases and h denotes the number of lines, one needs to iterate over $b^h$ solutions, which becomes computationally intractable even for relatively small values of b and h. Dynamic programming takes advantage of redundancies in the computation of the recursion algorithm. Instead of computing the same intermediate recursion result over and over again, the intermediate result is computed once and stored in a cache. When the same result is needed again, it is looked up from that cache. This caching strategy is also known as memoization. Beyond memoization, an iterative version of the algorithm can be used that does not use recursion and therefore avoids associated recursion overhead. This is known as tabulation. The efficiency of the dynamic programming algorithm becomes $h*b^2$, which is much faster than the exponential complexity of the naïve recursion algorithm.

These dynamic programming techniques are illustrated in FIG. 2 at 214. Dynamic programming thus may enable discovery of the solution that yields a global minimum of the cost function, while reducing the computational cost of evaluating the cost function such that the line bias correction is determined within a framerate of video data being corrected. In some examples, as mentioned above, the use of dynamic programming may include the use of memoization 215 or tabulation 216 to store values from earlier computations for reuse in later computations. In some examples, using the cost function may include reducing, minimizing, or optimizing the cost function using memoization or tabulation.

After determining a suitably low value for the cost function, at 218, method 200 includes applying the line bias correction determined at 204 to each pixel in the nth line. As described above, applying a line bias correction may include applying an offset to a plurality of pixel values in a corresponding line. In some examples, this may include summing a positive or negative offset with a readout value for the pixel.

The example corrections described above can help address additive noise. Other noise may be multiplicative, and thus result in a gain applied to a line of pixels, rather than a bias. Such line gain may be corrected in a similar manner as described above, except that each readout value is multiplied by a gain term, rather than summed with bias term, for cost function determination. The gain terms may be varied and the cost function computed for each combination of gain terms to reduce the cost function value (e.g., until the value is equal to or less than a threshold value, until a predetermined number of iterations, or until a local or global minimum is reached).

At 222, method 200 includes determining whether additional line(s) remain in the image for which a line bias correction process has not yet been performed. If it is determined that additional line(s) do remain (YES), method 200 proceeds to 223, where the line bias determination process proceeds to the next line ("N++") after the nth line in the image. Following 223, method 200 returns to 204 where a line bias correction may be determined for the next line. In some examples, method 200 may iterate through each line in the image, determining and applying line bias corrections for each line. For the last line at the end of the image, gradient computations may be performed between the last line and the first line, or may use a single adjacent line.

In some examples, line bias corrections may be determined for and applied to lines other than the lines that received line bias corrections at 218. For example, line bias corrections may be determined for and applied to rows of pixels in an image, resulting in an image having pixel rows that are bias-corrected. Line bias corrections may then be determined for and applied to columns of pixels in the resulting image, producing a final image having bias-corrected rows of pixels and columns of pixels. Row and column bias corrections may be performed in any suitable order (e.g., alternately in a single image, or with row bias corrections being applied following the application of column bias corrections).

Continuing with FIG. 2, if it is determined at 222 that additional line(s) do not remain (NO), method 200 proceeds to 224, where a bias-corrected image is output via a display. In some examples, outputting the bias-corrected image may include outputting 226 the bias-corrected image in real-time. For example, the imaging device may produce a plurality of image frames that form video, and method 200 may be used to produce bias-corrected images for each of the plurality of images, and to display the bias-corrected images in real-time (e.g., at a framerate substantially equal to a framerate at which the plurality of images is received from the imaging device). In some examples, the display device may be a head-mounted display device, while in other embodiments any other suitable display device may be used. In yet other examples, the bias-corrected image may be output for storage (compressed or uncompressed) and thus for later display.

The approaches described herein may enable the efficient correction of line bias and temporal line noise in images, as well as the real-time display of bias-corrected images. It will be understood that the described approaches may be used with images produced by any suitable type of image sensor, including but not limited to complementary metal-oxide-semiconductor (CMOS)-based image sensors, charge-coupled device (CCD)-based image sensors, and bolometer-based image sensors. Moreover, the disclosed approaches may be used to correct any suitable type of function that modifies pixel value(s), including but not limited to functions that apply additive and multiplicative offsets to pixel values. Still further, the disclosed approaches may be used in examples in which the number of lines in an image and the number of lines in an image sensor that produced the image are equal or unequal.

Figure 4:
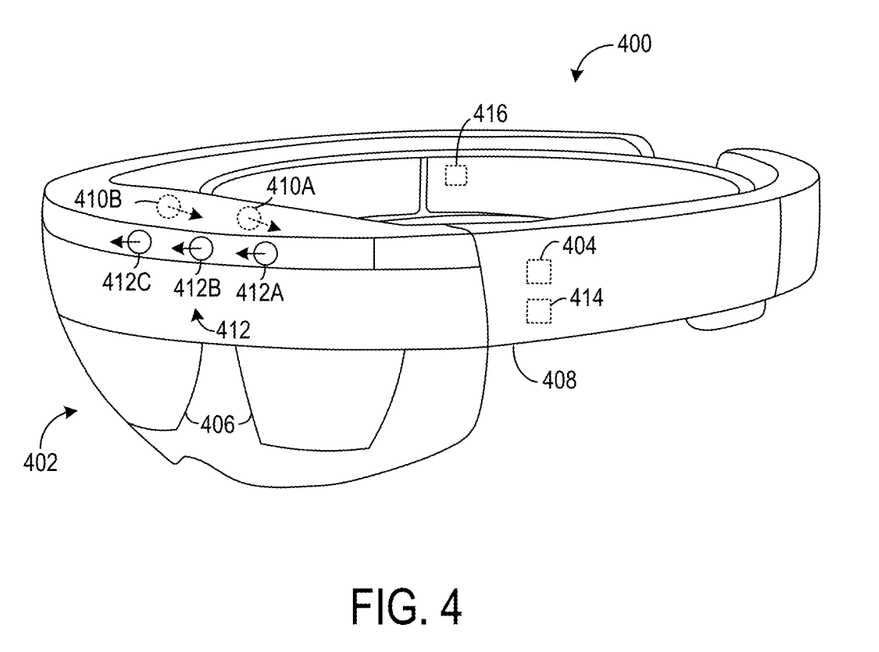
FIG. 4 shows an example HMD device.

FIG. 4 shows an example HMD device 400. HMD device 400 includes a near-eye display 402 configured to present any suitable type of visual experience. In some examples, display 402 is substantially opaque, presenting virtual imagery as part of a virtual reality experience in which a wearer of HMD device 400 is completely immersed in the virtual reality experience. In other implementations, display 402 is at least partially transparent, allowing a user to view presented virtual imagery along with a real-world background viewable through the display to form an augmented reality experience, such as a mixed reality experience. In some examples, the opacity of display 402 is adjustable (e.g. via a dimming filter), enabling the display to function both as a substantially opaque display for virtual reality experiences and as a see-through display for augmented reality experiences. In some examples, head-mounted display 400 is configured for low-light imaging and/or thermal imaging.

HMD device 400 may take any other suitable form in which a transparent, semi-transparent, and/or non-transparent display is supported in front of a viewer's eye(s). Further, examples described herein are applicable to other types of display devices, including other wearable display devices and non-wearable display devices.

Any suitable mechanism may be used to display images via display 402. For example, display 402 may include a liquid crystal on silicon (LCOS) device or organic light-emitting diode (OLED) microdisplay located within a frame 408. In this example, the lenses 406 may serve as, or the HMD device 400 otherwise may include, a light guide, prism, or other element for delivering light from the display device to the eyes of a wearer. In other examples, display 402 may include a scanning mirror system (e.g. a micro-electromechanical display) configured to scan light from a light source in one or more directions to thereby form imagery. In some examples, eye display 402 may present left-eye and right-eye imagery via respective left-eye and right-eye displays.

HMD device 400 includes an on-board computer 404 operable to perform various operations related capturing and/or processing sensor data (e.g., image data), correcting line bias and temporal line noise in images, and rendering bias-corrected (and/or gain-corrected) images, among other tasks. In some implementations, various computing functions described above may be performed off-board. Example computer hardware is described in more detail below with reference to FIG. 6.

HMD device 400 may include various sensors and related systems to provide information to on-board computer 404. Such sensors may include, but are not limited to, one or more inward facing image sensors 410A and 410B and/or one or more outward facing image sensors 412A, 412B, and 412C of an imaging system 412; an IMU 414; and one or more microphones 416 such as a directional microphone array.

The inward facing image sensors 410A, 410B may acquire gaze tracking information from a wearer's eyes (e.g. sensor 410A may acquire image data for one of the wearer's eye and sensor 410B may acquire image data for the other of the wearer's eye).

The depicted outward-facing image sensors 412A, 412B, 412C collect image data (e.g. image frames) of a surrounding physical space. Image data collected by imaging system 412 may be used to measure physical attributes of the surrounding physical space. While the inclusion of three image sensors 412A-412C in imaging system 412 is shown, the imaging system may implement any suitable number of image sensors. In this example, imaging system 412 may include one or more of a low-light camera (e.g., implemented via image sensor 412A), a thermal camera (e.g., implemented via image sensor 412B), and an RGB camera (e.g., implemented via image sensor 412C). In some examples, one or more cameras may be integrated in a common image sensor—for example, an image sensor may be configured to collect RGB color data and depth data.

Data from imaging system 412 may be used by on-board computer 404 to detect movements, such as gesture-based inputs or other movements performed by a wearer, person, or physical object in the surrounding physical space. Data from imaging system 412 further may be used by on-board computer 404 to determine direction/location and orientation data (e.g. from imaging environmental features) that enables position/motion tracking of HMD device 400 in the real-world environment. In some implementations, data from imaging system 412 may be used by on-board computer 404 to construct still images and/or video images of the surrounding environment from the perspective of HMD device 400. In some examples, HMD device 400 may utilize image data collected by imaging system 412 to perform simultaneous localization and mapping (SLAM) of the surrounding physical space.

IMU 414 may be configured to provide position and/or orientation data of HMD device 400 to on-board computer 404. In some implementations, position and orientation data from imaging system 412 and IMU 414 may be used in conjunction to determine a position and orientation of HMD device 400. In yet other implementations, the pose of HMD device 400 may be computed via visual inertial SLAM.

HMD device 400 may also support other suitable positioning techniques, such as GPS or other global navigation systems. Further, while specific examples of position sensor systems have been described, it will be appreciated that any other suitable sensor systems may be used.

One or more microphones 416 may be configured to collect audio data from the surrounding physical space. Data from the one or more microphones 416 may be used by on-board computer 404 to recognize voice commands provided by the wearer to control the HMD device 400.

Figure 5A:
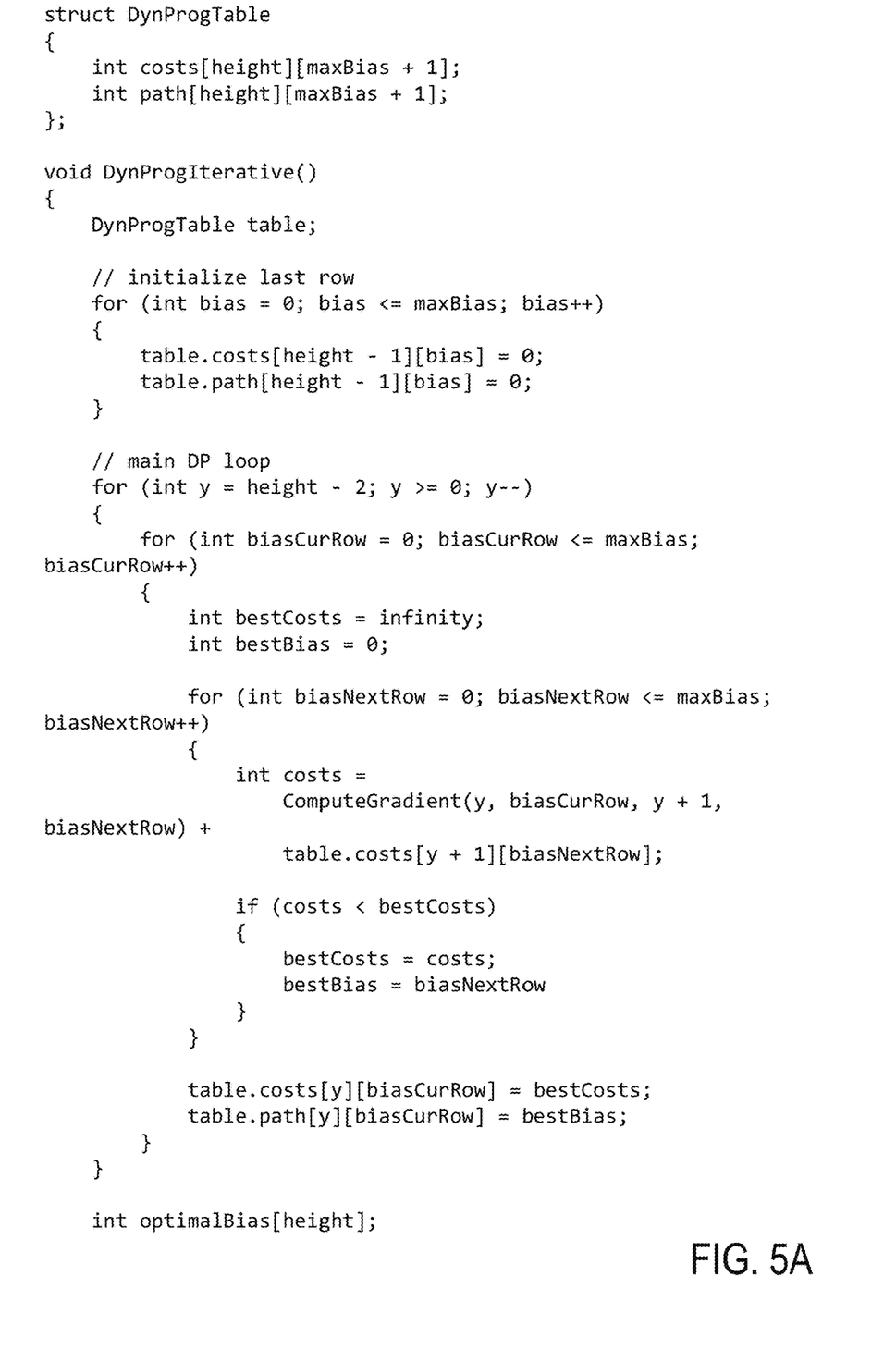
FIGS. 5A-5B show pseudo-code representing an example implementation of line bias correction.
Figure 5B:
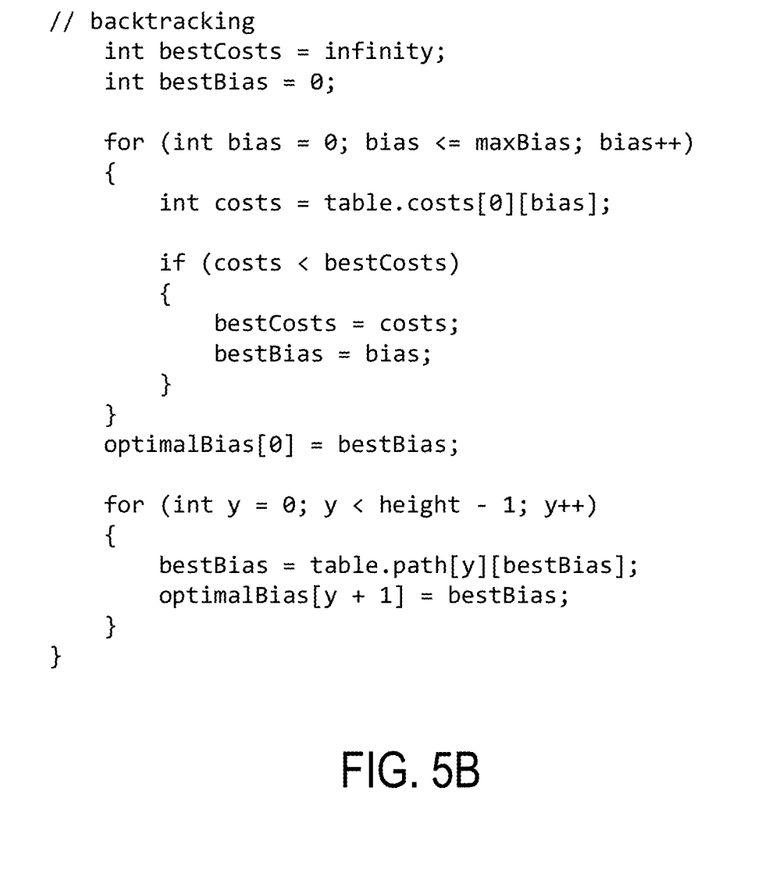

FIGS. 5A-5B show pseudocode representing an example implementation of the line bias correction described herein. The code shown in FIGS. 5A-5B may represent an implementation of pipeline 100 and/or method 200, for example.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
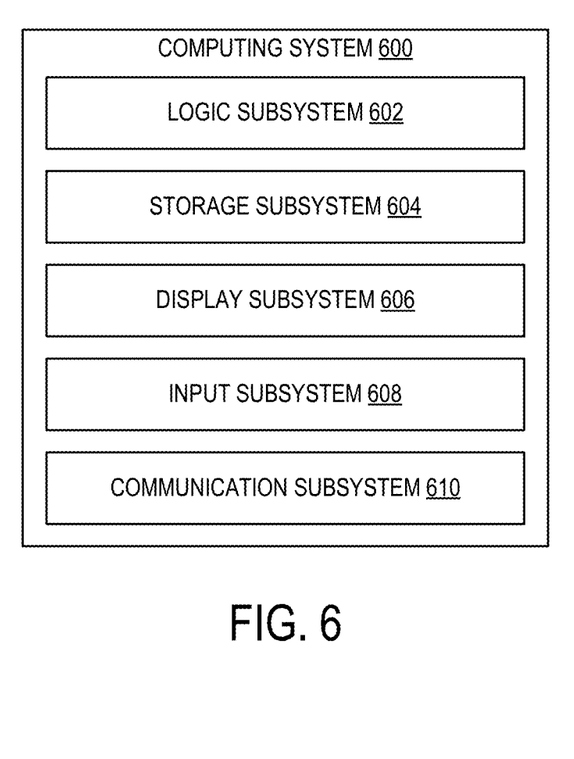
FIG. 6 shows a block diagram of an example computing system.

FIG. 6 schematically shows a non-limiting embodiment of a computing system 600 that can enact one or more of the methods and processes described above. Computing system 600 is shown in simplified form. Computing system 600 may take the form of one or more personal computers, server computers, tablet computers, home-entertainment computers, network computing devices, gaming devices, mobile computing devices, mobile communication devices (e.g., smart phone), and/or other computing devices. Imaging device 102, computing device 108 and on-board computer 404 are examples of computing system 600.

Computing system 600 includes a logic subsystem 602 and a storage subsystem 604. Computing system 600 may optionally include a display subsystem 606, input subsystem 608, communication subsystem 610, and/or other components not shown in FIG. 6.

Logic subsystem 602 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage subsystem 604 includes one or more physical devices configured to hold instructions executable by the logic machine to implement the methods and processes described herein. When such methods and processes are implemented, the state of storage subsystem 604 may be transformed—e.g., to hold different data.

Storage subsystem 604 may include removable and/or built-in devices. Storage subsystem 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 604 may include volatile, nonvolatile, dynamic, static, read/write, read-only, random-access, sequential-access, location-addressable, file-addressable, and/or content-addressable devices.

It will be appreciated that storage subsystem 604 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 602 and storage subsystem 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "engine" may be used to describe an aspect of computing system 600 implemented to perform a particular function. In some cases, an engine may be instantiated via logic subsystem 602 executing instructions held by storage subsystem 604. It will be understood that different engines may be instantiated from the same application, service, code block, object, library, routine, API, function, etc. Likewise, the same engine may be instantiated by different applications, services, code blocks, objects, routines, APIs, functions, etc. The term "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 606 may be used to present a visual representation of data held by storage subsystem 604. This visual representation may take the form of a graphical user interface (GUI). As the herein described methods and processes change the data held by the storage machine, and thus transform the state of the storage machine, the state of display subsystem 606 may likewise be transformed to visually represent changes in the underlying data. Display subsystem 606 may include one or more display devices utilizing virtually any type of technology. Such display devices may be combined with logic subsystem 602 and/or storage subsystem 604 in a shared enclosure, or such display devices may be peripheral display devices.

When included, input subsystem 608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

Another example provides a method, comprising receiving, from an imaging device, a plurality of images each comprising a plurality of lines of pixels, for each image of the plurality of images, for each line of pixels of the plurality of lines of pixels, based at least on one or more pixel values of one or more pixels in the line of pixels, determining a line bias correction for the line, and applying the line bias correction to each pixel in the line, the line bias correction comprising an offset applied to each pixel value in the line of pixels. In such an example, determining the line bias correction for the line may comprise using a cost function. In such an example, the cost function may include a sum of one or more gradients, each gradient being computed between a respective pixel in the line of pixels and a corresponding pixel in an adjacent line of pixels. In such an example, each gradient of the one or more gradients alternatively or additionally may include an absolute value of a difference between a readout value of a pixel in the line of pixels, and a readout value of a pixel in the adjacent line of pixels. In such an example, using the cost function may include computing the cost function for two or more potential line bias corrections for the line, and selecting the potential line bias correction that produces a lower cost function value. In such an example, using the cost function alternatively or additionally may comprise optimizing the cost function using dynamic programming. In such an example, using the cost function may additionally comprise using tabulation. In such an example, the offset may include an additive offset, and the method may further comprise determining a line gain correction for the line, and applying the line gain correction to each pixel in the line, the line gain correction comprising a multiplicative offset applied to each pixel value in the line of pixels. In such an example, each line of pixels of the plurality of lines of pixels may be a horizontal line of pixels, the plurality of images each may comprise a plurality of vertical lines of pixels, and the method may further comprise, for each vertical line of pixels, determining a line bias correction for the vertical line, and applying the line bias correction to each pixel in the vertical line.

Another example provides a computing device, comprising a logic subsystem, and a storage subsystem comprising instructions executable by the logic subsystem to receive, from an imaging device, a plurality of images each comprising a plurality of lines of pixels, for each image of the plurality of images, for each line of pixels of the plurality of lines of pixels, based at least on one or more pixel values of one or more pixels in the line of pixels, determine a line bias correction for the line, and apply the line bias correction to each pixel in the line, the line bias correction comprising an offset applied to each pixel value in the line of pixels. In such an example, the instructions executable to determine the line bias correction for the line may be executable to use a cost function. In such an example, the cost function may include a sum of one or more gradients, each gradient being computed between a respective pixel in the line of pixels and a corresponding pixel in an adjacent line of pixels. In such an example, each gradient of the one or more gradients alternatively or additionally may include an absolute value of a difference between a sum of a pixel value in the line of pixels and a line bias for the line of pixels, and a sum of a corresponding pixel value in the adjacent line of pixels and a line bias for the adjacent line of pixels. In such an example, the instructions executable to use the cost function may be executable to compute the cost function for two or more potential line bias corrections for the line, and to select the potential line bias correction that produces a lower cost function value. In such an example, the instructions executable to use the cost function alternatively or additionally may be executable to optimize the cost function using dynamic programming. In such an example, the instructions executable to use the cost function additionally may be executable to use tabulation. In such an example, the offset may include an additive offset, and the computing device may further comprise instructions executable to determine a line gain correction for the line, and apply the line gain correction to each pixel in the line, the line gain correction comprising a multiplicative offset applied to each pixel value in the line of pixels.

Another example provides a display device, comprising a display, a logic subsystem, and a storage subsystem comprising instructions executable by the logic subsystem to receive, from an imaging device, a plurality of images each comprising a plurality of lines of pixels, for each image of the plurality of images, for each line of pixels of the plurality of lines of pixels, based at least on one or more pixel values of one or more pixels in the line of pixels, and via dynamic programming, determine a line bias correction for the line, and apply the line bias correction to each pixel in the line to thereby produce a bias-corrected image, the line bias correction comprising an offset applied to each pixel value in the line of pixels, and output a respective bias-corrected image for each image of the plurality of images. In such an example, the respective bias-corrected images may be output to a display in real-time. In such an example, the offset may include an additive offset, and the display device may further comprise instructions executable to determine a line gain correction for the line, and to apply the line gain correction to each pixel in the line, the line gain correction comprising a multiplicative offset applied to each pixel value in the line of pixels.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method, comprising
receiving, from an imaging device, a plurality of images each comprising a plurality of lines of pixels;
for each image of the plurality of images,
for each line of pixels of the plurality of lines of pixels,
based at least on one or more pixel values of one or more pixels in the line of pixels, determining a line bias correction for the line by computing a cost function for each of two or more potential line bias corrections, and selecting a potential line bias correction that produces a lower cost function value as the line bias correction; and
applying the line bias correction to each pixel in the line, the line bias correction comprising an offset applied to each pixel value in the line of pixels.

2. The method of claim 1, wherein determining the line bias correction for the line comprises computing the cost function until a value of the cost function is equal to or less than a threshold value.

3. The method of claim 1, wherein the cost function includes a sum of one or more gradients, each gradient being computed between a respective pixel in the line of pixels and a corresponding pixel in an adjacent line of pixels.

4. The method of claim 3, wherein each gradient of the one or more gradients includes an absolute value of a difference between
a readout value of a pixel in the line of pixels, and
a readout value of a pixel in the adjacent line of pixels.

5. The method of claim 1, wherein computing the cost function includes computing the cost function until a determined local minimum is reached.

6. The method of claim 1, wherein using the cost function comprises optimizing the cost function using dynamic programming.

7. The method of claim 1, wherein using the cost function comprises using tabulation.

8. The method of claim 1, wherein the offset includes an additive offset, the method further comprising determining a line gain correction for the line, and applying the line gain correction to each pixel in the line, the line gain correction comprising a multiplicative offset applied to each pixel value in the line of pixels.

9. The method of claim 1, wherein each line of pixels of the plurality of lines of pixels is a horizontal line of pixels, and wherein the plurality of images each comprises a plurality of vertical lines of pixels, the method further comprising, for each vertical line of pixels, determining a line bias correction for the vertical line, and applying the line bias correction to each pixel in the vertical line.

10. A computing device, comprising
a logic subsystem; and
a storage subsystem comprising instructions executable by the logic subsystem to
receive, from an imaging device, a plurality of images each comprising a plurality of lines of pixels;
for each image of the plurality of images, for each line of pixels of the plurality of lines of pixels, based at least on one or more pixel values of one or more pixels in the line of pixels, use a cost function to determine a line bias correction for the line by computing the cost function for two or more potential line bias corrections for the line, and selecting a potential line bias correction that produces a lower cost function value; and apply the line bias correction to each pixel in the line, the line bias correction comprising an offset applied to each pixel value in the line of pixels.

11. The computing device of claim 10, wherein the instructions are executable to compute the cost function for a predetermined number of iterations.

12. The computing device of claim 10, wherein the cost function includes a sum of one or more gradients, each gradient being computed between a respective pixel in the line of pixels and a corresponding pixel in an adjacent line of pixels.

13. The computing device of claim 12, wherein each gradient of the one or more gradients includes an absolute value of a difference between a readout value of a pixel in the line of pixels, and
a readout value of a pixel in the adjacent line of pixels.

14. The computing device of claim 10, wherein the instructions executable to use the cost function are executable to optimize the cost function using dynamic programming.

15. The computing device of claim 10, wherein the instructions executable to use the cost function are executable to use tabulation.

16. The computing device of claim 10, wherein the offset includes an additive offset, further comprising instructions executable to determine a line gain correction for the line, and apply the line gain correction to each pixel in the line, the line gain correction comprising a multiplicative offset applied to each pixel value in the line of pixels.

17. A display device, comprising
a display;
a logic subsystem; and
a storage subsystem comprising instructions executable by the logic subsystem to
receive, from an imaging device, a plurality of images each comprising a plurality of lines of pixels;
for each image of the plurality of images,
for each line of pixels of the plurality of lines of pixels,
based at least on one or more pixel values of one or more pixels in the line of pixels, and via dynamic programming, use a cost function to determine a line bias correction for the line by computing the cost function for two or more potential line bias corrections for the line, and selecting a potential line bias correction that produces a lower cost function value, and
apply the line bias correction to each pixel in the line to thereby produce a bias-corrected image, the line bias correction comprising an offset applied to each pixel value in the line of pixels; and
output a respective bias-corrected image for each image of the plurality of images.

18. The display device of claim 17, wherein the respective bias-corrected images are output to a display in real-time.

19. The display device of claim 17, wherein the offset includes an additive offset, further comprising instructions executable to determine a line gain correction for the line, and to apply the line gain correction to each pixel in the line, the line gain correction comprising a multiplicative offset applied to each pixel value in the line of pixels.

\* \* \* \* \*